July 30, 1929.  W. D. BELL  1,722,835
MEASURING AND DISPENSING APPARATUS
Filed June 25, 1926   5 Sheets-Sheet 1

Fig.1.

INVENTOR.
William D. Bell,
BY
Geo. P. Kimmel ATTORNEY.

July 30, 1929.  W. D. BELL  1,722,835
MEASURING AND DISPENSING APPARATUS
Filed June 25, 1926  5 Sheets-Sheet 2

INVENTOR.
William D. Bell,
BY
Geo. T. Kimmel
ATTORNEY.

Patented July 30, 1929.

1,722,835

UNITED STATES PATENT OFFICE.

WILLIAM D. BELL, OF MINNEAPOLIS, MINNESOTA.

MEASURING AND DISPENSING APPARATUS.

Application filed June 25, 1926. Serial No. 118,569.

This invention relates to a liquid measuring and dispensing apparatus, designed primarily for use in connection with gasoline service stations, but it is to be understood that an apparatus, in accordance with this invention can be employed for any purposes for which it is found applicable, and the invention has for its object to provide, in a manner as hereinafter set forth, an apparatus of the class referred to for measuring and recording the amount of liquids dispensed, especially when the said liquids are sold at some fixed price, as well as further measuring the liquids dispensed with great accuracy, indicating to the dispenser and customer, the exact amount dispensed and the cost at the price charged, and further for keeping a record of the total amount sold at any desired length of time and the number of patrons served.

Further objects of the invention are to provide a liquid measuring and dispensing apparatus in a manner as hereinafter set forth and which is comparatively simple in its construction and arrangement, strong, durable, compact, thoroughly efficient in its use, conveniently operated, and comparatively inexpensive to set up.

With the foregoing and other objects in view, the invention consists of the novel construction, combination and arrangement of parts as hereinafter more specifically scribed and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several view:

Figure 4ᴬ is a view of the upper portion of Figure 2, upon an enlarged scale.

In connection with the liquid measuring, dispensing and recording apparatus, in accordance with this invention, it is to be understood that the units of measure may be varied to meet any requirements and the price and total cost may be easily changed to conform to the market.

Referring to the drawings in detail, an apparatus for the purpose set forth and in accordance with this invention includes a vertically disposed housing referred to generally by the reference character 1 and which includes a lower or supporting portion 2, an intermediate portion 3 providing a chamber 4 and an upper portion 5 forming a chamber 6. The portion 2 is formed with a base 7 and is closed at its front, rear and side. The portion 2 is hollow and opens into the chamber 4. Preferably the back of the housing is formed from a single wall, as indicated at 8 and said wall 8 at the top thereof is provided with an opening 9, normally closed by a hinged door 10 and the latter provides means, in connection with the opening 9, so that access can be had to the chamber 6. The upper portion 5 is of less height and width than the height and width of the intermediate portion 3 and the latter is of greater height than the lower portion.

The chambers 4 and 6, at the front thereof, are closed by a removable plate 11 which corresponds in contour to the shape of the portions 3 and 5 and is detachably secured in position, by hold fast devices 12 which extend through the plate 11 and engage in apertured lugs 13, formed on the inner face of the body portion of the housing at the intermediate portion 3 and upper portion 5. The lugs are arranged in spaced relation.

Leading from a source of supply, up through the lower portion 2 of the housing 1 and into the chamber 4 and further opening into a controlling valve mechanism, to be presently referred to, is a feed pipe 14, for supplying liquid under pressure.

Positioned within the lower portion of the chamber 4, centrally thereof, is a measuring cylinder 15 provided at each end with a head and the said heads are indicated at 16, 17 and are fixedly secured to the body portion of the cylinder 15 by hold fast devices 18. The head 16 is formed with a central opening 19 having a threaded wall. Extending through the opening 19 and threadedly engaging with the said threaded wall of the opening 19 is a sleeve 20. Securing nuts 21 engage with the sleeve 20 and one of which abuts against the head 16. The sleeve 20 projects an appropriate distance within the measuring chamber 22 formed by the cylinder 15. That end of the sleeve 20 which projects into the measuring chamber is indicated at 22′ and acts as a stop for a purpose to be presently referred to. Threadedly engaging with the sleeve 20 at the outer end thereof, as well as projecting from said outer end, is an inverted T-coupling 23 having a packing element 24 secured in the outer end thereof.

The head 17 is formed with an opening 25 and further formed with an outwardly extending sleeve 26 of appropriate length. The wall of the opening 25 as well as the inner face of the sleeve 26 at the inner end terminal thereof is threaded and threadedly engaging with the wall of the opening 25 and inner face of the sleeve 26 is a collar 27, the latter being peripherally threaded and projecting an appropriate distance within the measuring chamber 22. That end of the collar 27 which projects into the measuring chamber 22 is indicated at 28. The sleeve 26 centrally thereof and at its top is formed with an opening 29 and is also formed with a collar 30 which is integral with the outer face of the sleeve 26 and forms a continuation of the opening 29. The collar 30 is interiorly threaded. The sleeve 26 is also formed with an interiorly arranged annular flange 31 spaced inwardly with respect to the outer end thereof. That portion of the inner face of the sleeve 26, outwardly with respect to the flange 31, is threaded and engaging therewith is a packing element 32.

Extending through the packing element 24, sleeve 20, measuring chamber 22, collar 27, sleeve 26 and packing element 32 is a piston rod 33 of materially less diameter than the inner diameter of the sleeve 20 or collar 27. The sleeve 20 provides a combined inlet and outlet for the chamber 22 at one end of the cylinder 15 and the collar 28 provides a combined inlet and outlet for the chamber 22 at the other end of the cylinder 15. Fixed to the piston rod 33 and operating in the measuring chamber 22 is a dispensing piston 34.

Figure 7:
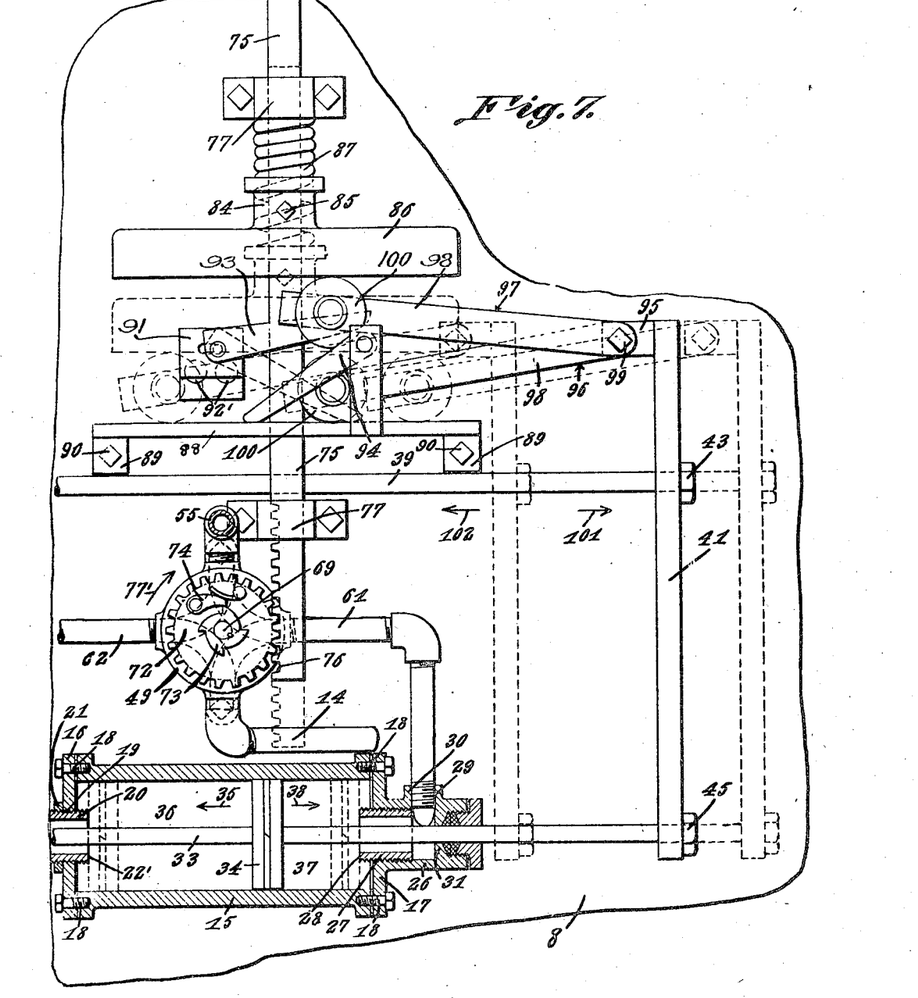
Figure 7 is a fragmentary view, upon an enlarged scale and in front elevation, illustrating in full and dotted lines the position of certain of the elements of the apparatus during a measuring, dispensing and recording operation.

With reference to Figure 7, when the piston 34 moves in the direction of the arrow 35 it is expelling or dispensing the liquid or fluid from the portion 36 of the measuring chamber and providing for an intake of liquid or fluid into the portion 37 of the measuring chamber. When the piston 34 moves in the direction of the arrow 38 it provides for the dispensing of the liquid or fluid from the portion 37 of the measuring chamber and further provides for an intake of liquid or fluid into the portion 36 of the measuring chamber. A reciprocatory shiftable means is connected to and moved by the piston rod and said means is in the form of an inverted U-shaped frame comprising a top bar 39 and a pair of end bars 40, 41. The bar 39 is connected to the top of the bar 40, by the hold fast device 42. The bar 41 is of greater height than the bar 40, projects a substantial distance above the bar 39, and the latter is secured to the bar 41, below the upper end thereof, by the hold fast device 43. The lower end of the bar 40 is secured to one end of the piston rod 33, by the hold fast device 44 and the bar 41 is connected at its lower end to the other end of the piston rod 33 by hold fast device 45.

Formed integral with the rear side of the cylinder 15 is a lengthwise extending suspension arm 46, of appropriate height, and which is provided with a pair of oppositely extending flanges 47, through which extend hold fast devices 48 for fixedly securing said arm to the inner face of the back wall 8.

Figures 3, 4:
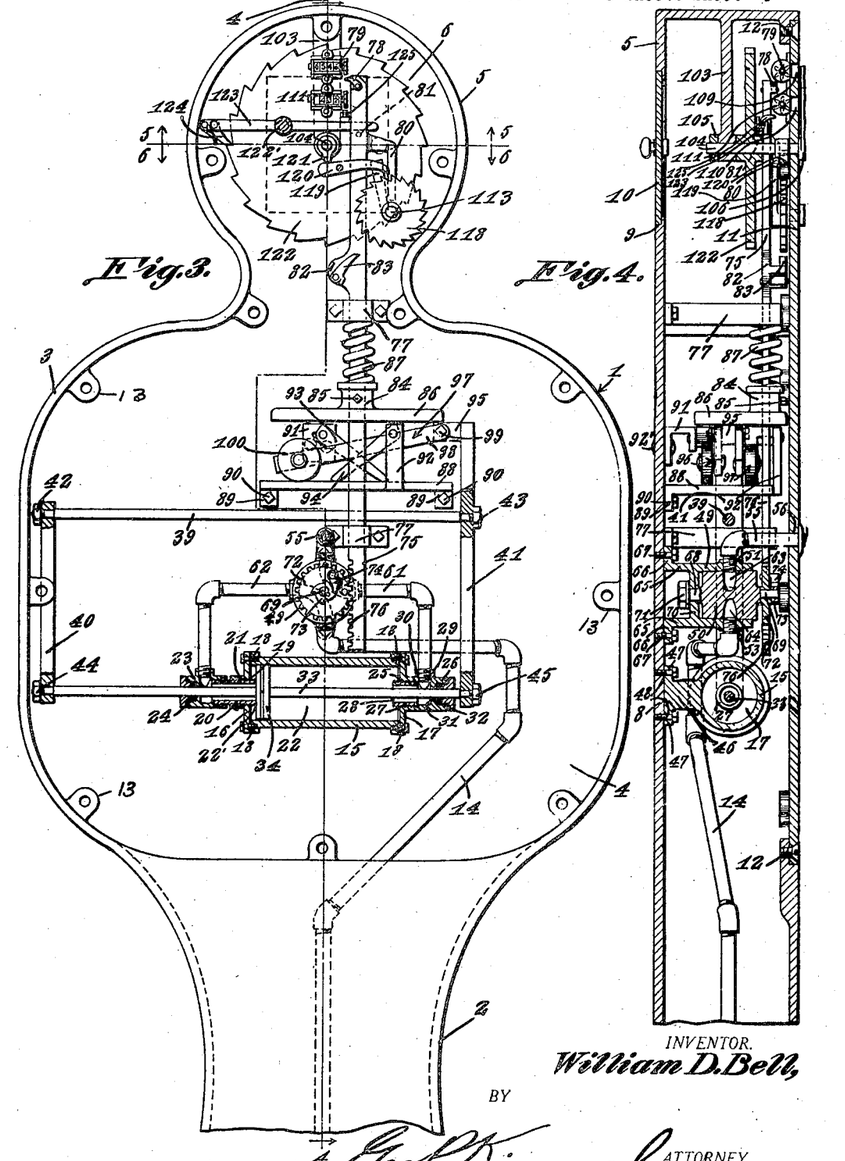
Figure 3 is a front elevation, partly in section of the apparatus, and with a portion of the front of the housing or casing removed.
Figure 4 is a section on line 4—4, Figure 3.
Figure 4A:
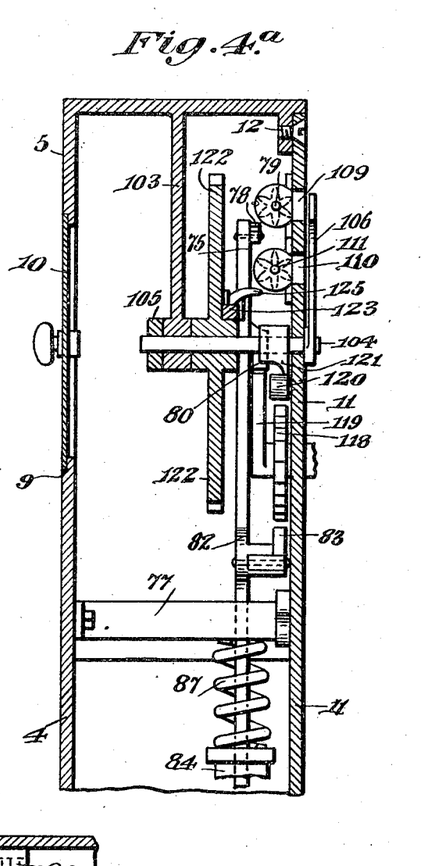
Figures 6, 8:
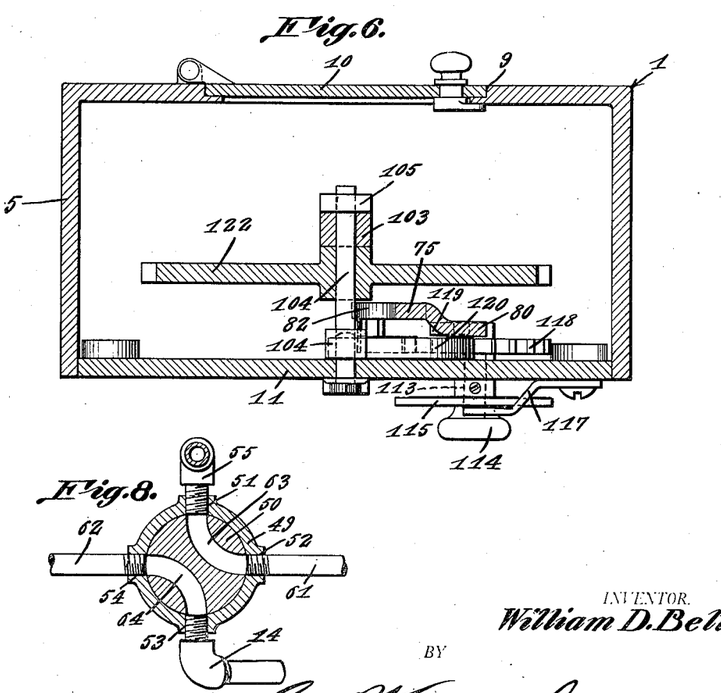
Figure 6 is a section on line 6—6, Figure 3.
Figure 8 is cross sectional view of the controlling valve.

Arranged over the cylinder 15 and extending at right angles with respect to the length of said cylinder 15, is a valve casing 49, see Figure 4 for a controlling valve 50. The valve-casing 49, see Figure 8 is provided with four ports 51, 52, 53 and 54 arranged equidistant with respect to each other. The wall of each of said ports is threaded. Connected to the port 51 and opening into the valve casing 50 is the service pipe 55 which extends through an opening 56 formed in the plate 11 approximately centrally thereof and is provided at its outer end with a cut-out 57 and a nozzle 58 or in other words the outer end of the service pipe has a faucet connected therewith. The portion of the service pipe 55 which projects from the plate 11 and which is indicated at 59 is flexible and of appropriate length. The plate 11 has secured to the outer face thereof a holder element 60 for detachably connecting the free end of the service pipe therewith, see Figure 1. Connected to the port 52 and opening into the casing 49 is a combined supply and dispensing pipe 61 which is connected to the collar 30 and opens into the sleeve 26. Connected to the port 53 and opening into the valve casing 49 is the feed pipe 14 which leads from the source of supply. Connected to the port 54 is a combined supply and dispensing pipe 62 which opens into the T-coupling 23 and is connected therewith. The pipe 61 is employed for supplying fluid or liquid to the measuring chamber 22 and for dispensing a measured quantity of fluid or liquid from said measuring chamber 22 by conducting the same to the service pipe 55. The pipe 62 is employed for supplying fluid or liquid to the measuring chamber 22 and for dispensing a measured quantity of liquid from said chamber by conducting it to the service pipe 55. The valve 50 is provided with a pair of curved ports 63, 64, see Figure 8. The ends of the port 63 open at the periphery of the valve 50. The ends of the port 64 open at the periphery of the valve 50. The port 63 is adapted to register with the ports 51 and 52 to provide for the measured fluid or liquid to be conducted from the pipe 61 to the pipe 55 and the port 64 is adapted to register with the ports 51 and 54 for dispensing a measured quantity of liquid or fluid of the measuring chamber by the pipe 62 and service pipe 55. The port 63 is also adapted to register with the ports 52 and 53 to provide for a supply of liquid or fluid to the measuring chamber when the port 63 establishes communication between the pipes 14 and 61. The port 64 is adapted to register with the ports 54 and 53 to provide for a supply of fluid or liquid to the measuring chamber when the port 64 registers with the ports 53 and 54 to establish communication between the pipes 14 and 62. The valve 50 is shifted in the manner as hereinafter referred to to provide for the alternate supply and dispensing of the liquid or fluid to and from the measuring chamber and with respect to the flow of the liquid the latter may flow from pipe 14 through port 63 into the pipe 62; from pipe 61 through port 64 to pipe 55, from pipe 62 through port 63 to pipe 55 and from pipe 14 through port 64 to pipe 61.

Extending rearwardly from the valve casing 49, see Figure 4, is a tubular extension 65 provided with a flange 66 which abuts against the inner face of the rear wall 8 and is fixedly secured therewith by the hold fast devices 67. The valve 50 is of the plug type and snugly engages the inner face of the valve casing. The valve 50 is formed with a pair of oppositely extending stems 68, 69, see Figure 4. The stem 68 extends through the rear wall 70 of the casing 49 and carries a stop member or nut 71 arranged rearwardly with respect to the wall 70. Loosely mounted on the stem 69, is a gear wheel 72 arranged rearwardly with respect to a ratchet 73 which is fixed to the stem 69. The gear wheel 72 carries a spring controlled dog 74 which coacts with the ratchet 73 for the purpose of shifting the valve 50 a quarter revolution to establish communication between the source of supply and one end of the cylinder 15 and to establish communication between the other end of the cylinder 15 and the service pipe 5. The valve 50 will alternately establish communication between the ends of the cylinder 15 and the source of supply and alternately establish communication between the ends of the cylinder 15 and the service pipe 55.

The gear wheel 72, is revolved in a direction to turn the stem 69, for the purpose of shifting the valve 50, by a spring controlled vertically movable plunger 75, shifted against the action of its controlling spring by a lifting mechanism, to be presently referred to, operated by the reciprocatory shiftable means formed of the inverted U-shaped frame consisting of the top bar 39 and the pair of end bars 40, 41. The vertically movable plunger 75 consists of an upstanding bar of appropriate length having the lower portion of one side edge thereof toothed as at 76. The teeth of said plunger 75 mesh with the gear 72 for the purpose of revolving it in opposite directions on the stem 69 and when the gear 72 is revolved in the direction of the arrow 77' the dog 74 will engage the ratchet 73 and shift the valve a quarter turn. The gear 72 is moved in the direction of the arrow 77' on the downward movement of the rod 75, but when the rod or plunger 75 moves upwardly the gear 72 is revolved in an opposite direction but the dog 74 rides over the ratchet 73 and does not shift the valve 50. The plunger 75 is of a length to extend up into the chamber 6 and a pair of superposed combined guide and retaining members 77 are secured to the back wall 8, through which guides the plunger 75 extends.

The upper end of the plunger 75 carries a dog or pawl 78 for operating the recorder mechanism 79 to register the total amounts sold in any desired length of time. The plunger 75 has formed integral therewith, as well as projecting laterally therefrom, an inverted L-shaped nose 80 which is positioned below the pawl 78 and said plunger 75 carries on that side thereof opposite the side which carries the pawl 78 a pin 81 which is arranged substantially in alinement with the top edge of the nose 80. The plunger 75 at a substantial distance below the pin 81 is provided with an offset portion 82 which projects laterally in an opposite direction with respect to the direction in which the nose 80 projects. Pivotally connected to the offset 82 is a counter balanced dog 83. The function of the pin or lug 81 and pawl 83 will be presently referred to. Fixedly secured to the plunger 75 a substantial distance below the pawl or dog 83 is a collar 84 and which is fixedly secured in position by a set screw 85 but the latter permits of adjusting the collar 84 lengthwise with respect to the plunger 75. Formed integral with the collar 84 at the bottom thereof and projecting rearwardly therefrom is a rectangular elevating plate 86 for the plunger 75. The plate 86 projects slightly forward of the bottom of the collar 84 and the plunger 75 extends through the plate 86. Mounted on the plunger 75 and interposed between the upper guide and retaining member 77 and the top of the collar 84 is a coil spring 87 permanently acting to force the plunger downwardly to the dotted line position shown in Figure 7. The plunger 75 is normally retained in an elevated position or normally latched in an elevated position against the action of its controlling spring 87, and when the plunger 75 is released the spring 87 lowers the plunger to the dotted line position shown in Figure 7 and provides for the revolving of the gear wheel 72, which in connection with the pawl 74 engaging with the ratchet 73 will revolve the valve 50 a quarter revolution. The nose 80 is employed for normally maintaining the plunger 75 in an elevated position against the action of its controlling spring 87 and the means which associates with the nose 80 will be presently referred to.

Figure 9:
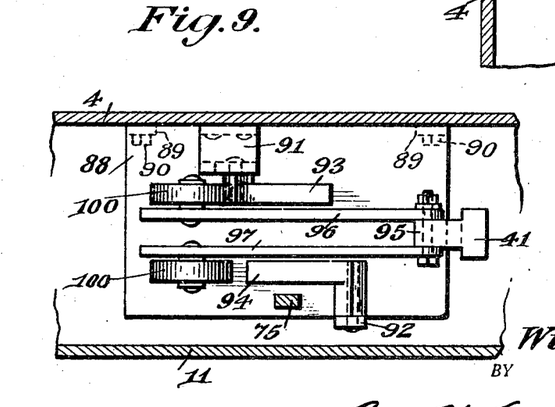
Figure 9 is a top plan view, upon an enlarged scale, illustrating the tracks for the shifting elements for the plunger and further showing the supports for the tracks.

The plunger 75 is moved upwardly due to the action of fluid pressure, that is to say due to the action of the fluid or liquid acting to shift the piston 34 which in turn will carry the piston rod 33 therewith, and as the latter is connected to the shiftable frame it will be moved to operate a plunger elevating mechanism which associates with the plate 86. The said plunger elevating mechanism comprises a platform 88 which is arranged above the top bar 39 of the shiftable frame and said platform 88 has depending flanges 89, through which extend hold-fast devices 90 fixedly securing the platform 88 to the back wall 8. Arranged over the rear of the platform 88, near one end thereof, is a support 91 which is fixedly secured against the inner face of the wall 8 by the hold fast device 92'. The support 91 projects slightly forward with respect to the wall 8. The platform 88 has secured to the front edge thereof, at a point between its center and that end opposite the end with which the support 91 is arranged over, a vertical arm 92. Pivotally connected to the support 91 is the upper end of a track member 93 and pivotally connected to the upper end of the arm 92 is a track member 94. The track members are positioned in sidewise arrangement and are oppositely disposed with respect to each other. The support 91 is positioned between the transverse median and one end of the platform 88 and the arm 92 is arranged between the transverse median of the platform 88 and the other end thereof. The upper end of the rod 41 is formed with a laterally extending arm 95 of appropriate length and which is adapted to extend over one end of the platform 88 only when in its extreme leftward position. The arm 95 has pivotally connected therewith a pair of sidewise arranged elevating elements, see Figures 3, 4, 7 and 9 and which are referred to generally by the reference characters 96 and 97. Each of said elevating elements normally inclines downwardly from the arm 95 over the platform 88 and consists of a bar 98, pivotally connected at its upper end, as at 99 to the arm 95 and carrying in proximity to its lower end a roller 100. The track member 93 is arranged at the rear of the platform 88 and the track member 94 at the front thereof. When the shiftable frame is moved in the direction of the arrow 101 Figures 7 and 9, the elevating element 97 moves therewith so that the roller thereof travels up the track-way 94 and engages with the plate 86 and elevates the plunger 75. When the roller of the element 97 travels up the track 94 the roller of the element 96 will ride under the track 93 and elevate it. See Figure 7. The rollers 100 are of a size to pass under members 93 and 94. When the shiftable frame moves in the direction of the arrow 102 the roller of the elevating element 96 travels up the track 93 and raises the plate 86 which in turn moves the plunger 75 upwardly. As the roller of the elevating element 96 travels up the track 93 the roller of the elevating element 97 will ride under the track 94 and elevate the same. The tracks are of less length than the length of the platform 88 and the rollers of the elevating elements, when elevating the plate 86 travel over the pivoted ends of the tracks and fall down upon the platform. The various shifting positions of the elevating elements and the plate 86 are shown in full and dotted line positions in Figure 7. When the plunger 75 is shifted upwardly by one of the elevating elements the nose 80 is engaged by a means to be presently referred to, for the purpose of latching the plunger element in its normal or raised position. When the plunger 75 is in its normal position, the elevating element has passed over its respective trackway and dropped upon the platform 88 and will remain in such position until the shiftable frame is again moved in an opposite direction by the piston rod 33.

Arranged within the chamber 6, see Figures 3 and 4, is a hanger 103 which is integral with the top of the housing 1. Centrally thereof, and supported by the hanger 103, as well as the plate 11, is a shaft 104 provided at its inner end with a stop collar 105. The shaft 104 projects outwardly from the plate 11 and carries an indicating pointer 106. That portion of the plate 11 which provides the front closure for the chamber 6 is formed with a circular row of quantity cost indications 107, see Figure 1, and said row of indications surrounds the pointer 106. The indications are consecutively arranged and by way of example are in units of ten, and the units are from ten to two hundred. Arranged below the pointer 106, that is that end of the pointer which is connected to the shaft 104, is a price indication 108 setting forth the cost of the gasoline per gallon. The portion of the plate 11 which forms the front of the chamber 6 is provided with a pair of superposed slots 109 and 110 and the former is employed for viewing the recorder mechanism 79 and the latter from viewing a recording mechanism 111 to be presently referred to.

Arranged at the upper portion 5 of the casing or housing 1 is a combined indicating and latching mechanism and which acts to set the apparatus for dispensing and to indicate the number of gallons of liquid or fluid requested by the purchaser and further acts to retain the plunger 75 in an elevated position, against the action of its controlling spring 87, to discontinue the dispensing of the fluid or liquid after the quantity purchased by the customer has been furnished. The combined indicating and latching mechanism is shifted manually to release the plunger 75 so the latter will lower and on the upward movement of the plunger the said mechanism is shifted to engage and latch the plunger in an elevated position. The said combined indicating and latching mechanism is locked from movement in one direction, and in a manner to be presently referred to, and is not released until the pointer 106 is shifted to normal position. This operation will be more clearly set forth hereinafter.

Figure 1:
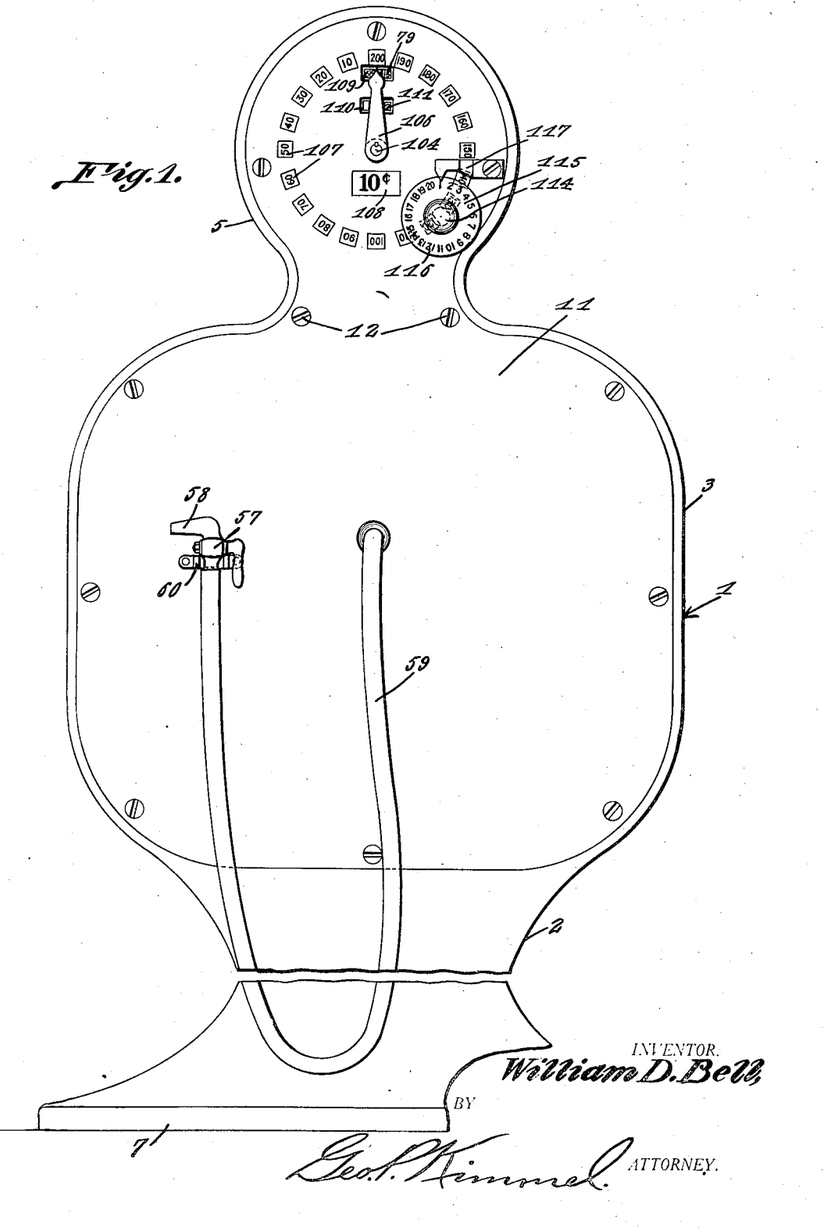
Figure 1 is a front elevation of a liquid measuring and dispensing apparatus in accordance with this invention.
Figure 2:
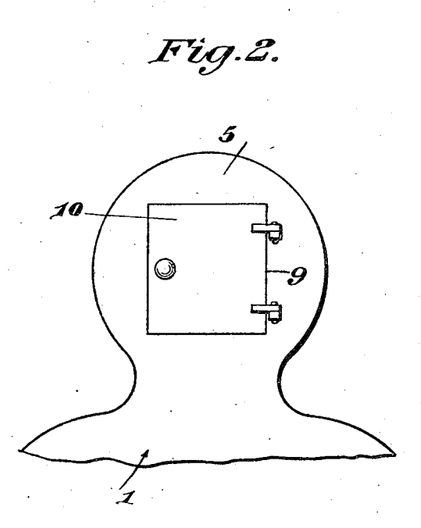
Figure 2 is a fragmentary view, in rear elevation of the apparatus, illustrating the upper portion thereof.

The combined indicating and latching mechanism, see Figures 1, 4 and 6 comprises a shaft 113 which is revolubly mounted in that portion of the plate 11 which forms a closure for the chamber 6. The shaft 113 projects inwardly and outwardly with respect to said portion of the plate 11 and has its outer end provided with a knob 114 to facilitate the shifting of the shaft. Carried by the shaft 113 exteriorly of the plate 11 is a disk 115 having its outer face provided with a series of indications 116 as shown by way of example, one to twenty. The shaft 113 is arranged below and to one side of the shaft 104. Secured to the plate 11 and arranged over the disk 115, which constitutes a dial, is a pointer 117 which associates with the indications 116 to designate the amount of fluid or liquid which is to be dispensed after the dial 115 has been set. In this connection it will be stated that if the purchaser desires ten gallons of gasoline the dial 115 is shifted until the indication ten registers with the pointer 117. The normal position of the pointer 117 with respect to the dial 115 is at the indication twenty. There is shown in Figure 1, that the dial has been shifted to indicate that the purchaser desires one gallon of gasoline or other liquid or fluid. The inner end of the shaft 113 carries a ratchet wheel 118 and fixed to the shaft 113 and extending above the ratchet wheel 118 is a latching member 119 which associates with the nose 80 for the purpose of maintaining the plunger 75 in an elevated position. The pawl 83 carried by the plunger 75 engages the ratchet wheel 118 and shifts the same to position the latch member 119 under the nose 80, whereby when the roller 100 of the active elevating element 96 or 97 moves clear of the plate 86, the plunger 75 is then moved downwardly by its controlling spring 87 and the nose 80 will engage the latching member 119 and the latter will maintain the plunger 75 in its normal or elevated locked position and will remain in such position until the shaft 113 is shifted to move the latching member 119 clear of the nose 80, thereby permitting the plunger 75 to move downwardly and which action is had through the medium of the controlling spring 87. The upward movements of the plunger 75 is had against the action of the controlling spring 87.

When the latching member 119 coacts with the nose 80 to maintain the plunger 75 in its normally elevated position, a means is provided to arrest the shifting of the shaft 113 and such means consists of a pivoted pawl 120 which engages the ratchet wheel 118 and is released by a protuberance 121 carried by the shaft 104. The pawl 120 prevents shifting of the shaft 113 in one direction and said pawl 120 is pivotally supported from the back wall 8 of the housing. The pawl 120 prevents back rotation of the wheel 118, after the latter has been set, that is to say after the dial has been set to indicate the number of gallons to be purchased by the customer. The pawl 120 is released when the pointer 106 has been returned to zero after indicating the cost for the amount of fluid or liquid which has been served to the customer.

Figure 5:
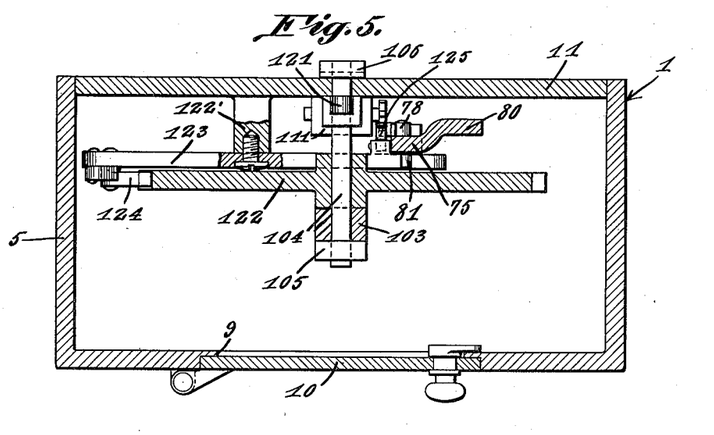
Figure 5 is a section on line 5—5, Figure 3.

The pointer 106 is operated through the medium of a ratchet wheel 122 carried by the shaft 104 and the latter is shifted by a lever arm 123 which is pivoted to a support 122′, and has its outer end provided with a spring-controlled dog 124 which engages in the teeth of the wheel 122. The inner end of the lever arm 123 is arranged in the path of the pin 81, so that when the plunger 75 is moved upwardly the arm 123 will be shifted on its pivot, and the dog 124 engaging the teeth of the ratchet 122 will shift the same carrying the pointer 106 therewith. See Figures 3 and 5. The lever arm 123 carries a pawl 125 for operating the recorder mechanism 111 for indicating the quantity of gasoline or fluid sold. The recorder mechanism 111 is used for recording the amount of gasoline or fluid dispensed daily whereas the recorder mechanism 79 is employed for recording the amount of fluid or gasoline dispensed for a predetermined period.

By way of example the measuring chamber 22 is set up for measuring a gallon of gasoline or other fluid and the arrangement of the cylinder 15 is such that when one gallon of gasoline is being dispensed through one end of the cylinder another gallon is taken in at the other end of the cylinder and if a customer desires five gallons of gasoline or fluid the apparatus is so set that after the plunger is released and before it is locked again, it will move upwardly five strokes or shifts causing the dispensing of five gallons of fluid and after the fifth stroke or shift is completed the latching member will be positioned to engage the nose 80 to prevent the lowering of the plunger. The pawl 83 on the plunger 75 shifts the ratchet wheel 118 one notch on each upward stroke or shift of the piston and the pin 81 on the plunger will rock the lever arm 123 successively five times for the purpose of shifting the ratchet 122 five notches to position the indicator 106 at the cost indication for five gallons and if the fluid is sold at ten cents a gallon the pointer 106 will be positioned at the indication 50. The inner ends 22' and 28 respectively of the sleeve 22 and collar 28 acts as stops for the piston 34.

To operate, liquid to be dispensed must be under pressure so that the same will be forced into the pipe 14. To dispense, turn pointer 106 to zero. This releases pawl 120, permits operator to turn dial 115 in either direction. The dial 115 is turned until pointer 117 registers the quantity of fluid desired which is indicated on the dial 115. As latching member 119 has been turned out of the path of nose 80, as soon as the faucet on the service pipe is opened, the pressure against piston 34 drives the latter to the opposite end of the cylinder 15 and carrying therewith the bars 39, 40 and 41. If piston 34 is driven to the left, roller 100 of elevating element 96 travels along the upper surface of track 93 lifting plate 86 until said element 96 passes over the upper and drops to platform 88, permitting plunger 75 to descend and turn gear one fourth revolution, thus actuating valve 50 and causing the liquid to be dispensed to enter the cylinder 15 from the other end. At the same time, elevating element 97 rolls on platform 88 under track 94 and passes out from thereunder. The valve 50 has been turned and the flow of liquid has been reversed. The elevating element 97 will next pass over track 94 and elevating element 96 will pass under track 93 to the opposite end of their respective tracks. With each upward stroke of the plunger 75 the pawl 83 turns ratchet 118 one notch and this action is repeated until the latching member 119 is positioned within the path of the nose 80 and holds the plunger 75 in an elevated position. The dial 115 may at any time be turned to zero but not in the opposite direction except when the pointer 106 points to zero. When service stops, pointer 106 will indicate the cost of the liquid dispensed.

It is thought the many advantages of a liquid dispensing and measuring apparatus, in accordance with this invention, can be readily understood, particularly in view of the fact that it will measure with great accuracy and further automatically register the number of units dispensed each time, as well as the cost of such service at current prices and further whereby the changing of the adjustment will be prevented and thus overcoming the dispensing of a greater quantity of liquid than a customer is entitled to receive, and although the preferred embodiment of the invention is as illustrated and described, yet it is to be understood that changes in the details of construction can be had which will fall within the scope of the invention as claimed.

What I claim is:

1. An apparatus for the purpose set forth comprising a combined measuring and dispensing mechanism including a measuring cylinder and fluid conducting means opening into the cylinder at two points and having a controlling valve to alternately establish communication between said points and a point of fluid supply and a point of discharge for the fluid supplied to said cylinder, spring urged means for intermittently operating said valve and releasable means for setting and latching said operating means to control the quantity of liquid to be dispensed.

2. An apparatus for the purpose set forth comprising in combination a combined liquid measuring and dispensing mechanism adapted to communicate with a source of supply and discharge and provided with a valve for controlling supply and discharge, spring urged means for operating said valve and normally in a latched position, and releasable means for setting and latching said operating means for controlling the quantity of liquid to be dispensed.

3. An apparatus for the purpose set forth comprising in combination a combined liquid measuring and dispensing mechanism adapted to communicate with a source of supply and discharge and provided with a valve for controlling supply and discharge, spring urged means for operating said valve and normally in a latched position, releasable means for setting and latching said operating means for controlling the quantity of liquid to be dispensed, and said means for setting and latching said operating means including coacting elements for latching the operating means after a predetermined quantity of liquid has been measured and dispensed.

4. An apparatus for the purpose set forth comprising in combination a combined measuring and dispensing mechanism adapted to communicate with a fluid supply and discharge for the fluid and including a controlling valve for directing the liquid to and from said mechanism, spring controlled means for operating said controlling valve, means for setting and latching said operating means for controlling the quantity of liquid to be dispensed, means operated from said operating means and including coacting elements for registering the accurate amount of liquid dispensed for a predetermined period and further including coacting elements for indicating the amount of liquid dispensed.

5. An apparatus for the purpose set forth comprising in combination a measuring cylinder, a fluid discharge element, a pair of fluid conducting pipes opening at two points into said cylinder, a valve common to said pipes and providing means for establishing communication through one of said pipes between said cylinder and a source of supply and through the other of said pipes between said cylinder and said discharge element, a piston operating in said cylinder, spring urged means for intermittently operating said valve in the same direction to cause the operation of said piston in opposite directions, and releasable means for setting and latching said operating means.

6. An apparatus for the purpose set forth comprising in combination a measuring cylinder, a fluid discharge element, a pair of fluid conducting pipes opening at two points into said cylinder, a valve common to said pipes and providing means for establishing communication through one of said pipes between said cylinder and a source of supply and through the other of said pipes between said cylinder and said discharge element, a piston operating in said cylinder, spring urged means for intermittently operating said valve and to cause the operation of said piston, releasable means for setting and latching said operating means, and said setting and latching means having coacting elements for latching the operating means after a predetermined quantity of liquid has been measured and dispensed.

7. An apparatus for the purpose set forth comprising a fluid discharging element, a fluid measuring cylinder, a combined fluid supply and conducting off line opening into each end of said cylinder, a piston reciprocating in said cylinder for simultaneously taking in and discharging fluid therefrom, a valve common to said lines and providing means for alternately establishing communication between a conducting line and said discharge element and a fluid supply, a normally latched spring urged plunger adapted when released to operate said valve to alternately close said lines to said element and fluid supply, and means operated from said piston for elevating said plunger after it has been lowered and the valve operated again.

8. In apparatus for the purpose set forth comprising a fluid discharging element, a fluid measuring cylinder, a combined fluid supply and conducting off line opening into each end of said cylinder, a piston reciprocating in said cylinder for simultaneously taking in and discharging fluid therefrom, a valve common to said lines and providing means for alternately establishing communication between a conducting line and said discharge element and a fluid supply, a normally latched spring urged plunger adapted when released to operate said valve to alternately close said lines to said element and fluid supply, means operated from said piston for elevating said plunger after it has been lowered and the valve operated again, and means for latching said plunger after a predetermined quantity of fluid has been dispensed.

9. An apparatus for the purpose set forth comprising a fluid discharging element, a fluid measuring cylinder, a combined fluid supply and conducting off line opening into each end of said cylinder, a piston reciprocating in said cylinder for simultaneously taking in and discharging fluid therefrom, a valve common to said lines and providing means for alternately establishing communication between a conducting line and said discharge element and a fluid supply, a normally latched spring urged plunger adapted when released to operate said valve to alternately close said lines to said element and fluid supply, means operated from said piston for elevating said plunger after it has been lowered and the valve operated again, and means operated from said plunger for registering the accurate amount of liquid dispensed for a predetermined period and with said means further including coacting elements to indicate the amount of liquid dispensed in one operation.

10. An apparatus for the purpose set forth comprising a fluid discharging element, a fluid measuring cylinder, combined fluid supply and conducting off line opening into each end of said cylinder, a piston reciprocating in said cylinder and controlling supply and discharge to and from the cylinder by said lines, a valve common to said lines and providing means for alternately establishing communication between a conducting line and said discharge element and a fluid supply, a normally latched spring urged plunger adapted when released to operate said valve, and means arranged above the valve and operated from said piston and further engaging said plunger for elevating the latter after it has been lowered and the valve operated again.

11. An apparatus for the purpose set forth comprising a fluid discharge element, a fluid measuring cylinder, a combined fluid supply and conducting off line opening into each end of said cylinder, a piston reciprocating in the cylinder and providing for the intake and discharge of fluid therefrom simultaneously and further acting to alternately open and close said lines, a valve common to said lines and providing means for alternately establishing communication between a conducting line and said discharge element and a fluid supply, a normally latched vertically movable spring urged plunger adapted when released to operate said valve, and reciprocatory means arranged above the valve and operated from said piston and further having sliding engagement with said plunger to elevate the latter after it has been lowered and the valve operated again.

In testimony whereof, I affix my signature hereto.

WILLIAM D. BELL